(12) United States Patent
Voirin et al.

(10) Patent No.: US 8,103,490 B2
(45) Date of Patent: Jan. 24, 2012

(54) METHOD TO AID THE DESIGN OF A SYSTEM ARCHITECTURE

(75) Inventors: Jean-luc Voirin, Brest (FR); Franck Tailliez, Leognan (FR)

(73) Assignee: Thales, Neuilly sur Seine (FR)

( * ) Notice: Subject to any disclaimer, the term of this patent is extended or adjusted under 35 U.S.C. 154(b) by 397 days.

(21) Appl. No.: 12/288,352

(22) Filed: Oct. 17, 2008

(65) Prior Publication Data
US 2009/0171643 A1 Jul. 2, 2009

(30) Foreign Application Priority Data
Oct. 19, 2007 (FR) ...................................... 07 07333

(51) Int. Cl.
*G06F 17/50* (2006.01)
*G06F 3/00* (2006.01)
(52) U.S. Cl. ................... 703/2; 703/6; 703/22; 717/162
(58) Field of Classification Search .............. 703/2, 22, 703/6; 717/162
See application file for complete search history.

(56) References Cited

U.S. PATENT DOCUMENTS

| | | | |
|---|---|---|---|
| 7,340,469 B1 * | 3/2008 | Alghathbar et al. ................. | 1/1 |
| 2006/0004548 A1 | 1/2006 | Santos et al. | |
| 2007/0250826 A1 * | 10/2007 | O'Brien ....................... | 717/162 |

OTHER PUBLICATIONS

Tang, etal. "Architecture Rationalization: A Methodology for Architecture Verifiability, Traceability and Completeness" Engineering of Computer Based systems, 2005. pp. 135-144.
Stormer, Anonymous: "Software Quality Attribute Analysis by Architecture Reconstruction(SQUA3RE)" 2007, pp. 361-364.

* cited by examiner

*Primary Examiner* — Thai Phan
(74) *Attorney, Agent, or Firm* — Stroock & Stroock & Lavan LLP

(57) ABSTRACT

The present invention relates to a method for aiding the design of a system architecture. The method for design of an architecture of a system according to an embodiment of the invention includes at least the following steps: functional and non-functional analysis of a technical requirement with which the system complies; formalization of points of view for analysis of the architecture of the system based on the functional and non-functional analysis; definition of one rule for analysis of the architecture of the system for each analysis point of view; construction of the architecture of the system; and analysis of the architecture according to the rules of analysis. The design of system architectures notably relates to the field of system engineering. The systems to which the present invention is applicable can be hardware systems, software systems, or systems combining both hardware and software. An embodiment of the present invention may be implemented in the framework of the development of an aircraft navigation system.

11 Claims, 15 Drawing Sheets

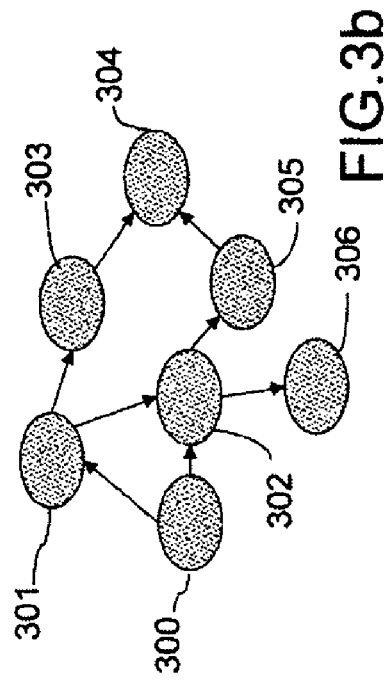
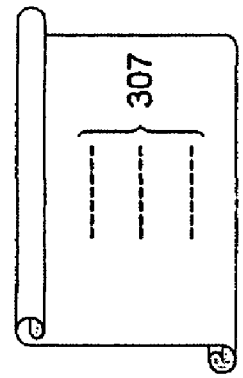
FIG.3b
FIG.3d
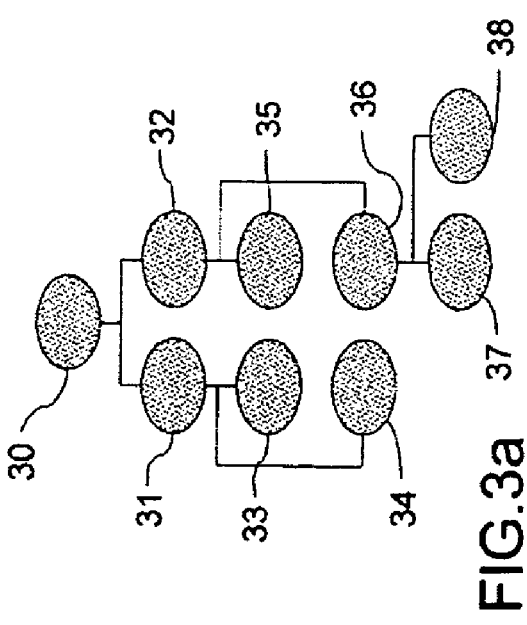
FIG.3a
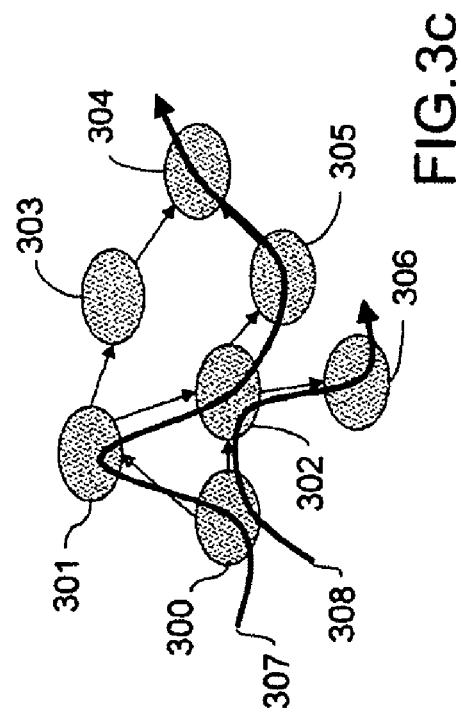
FIG.3c

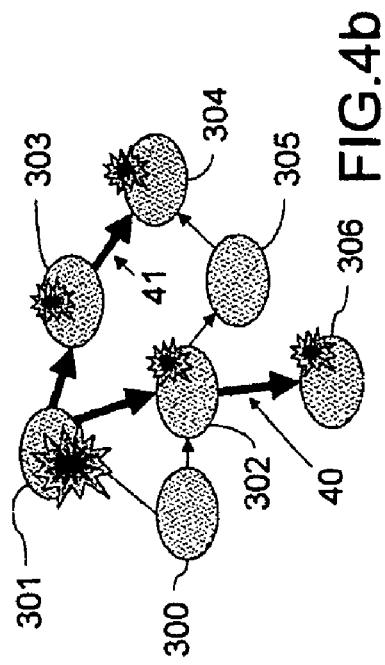
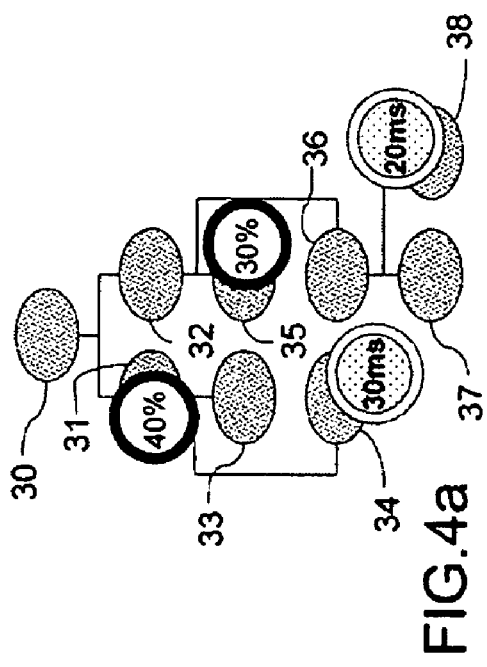
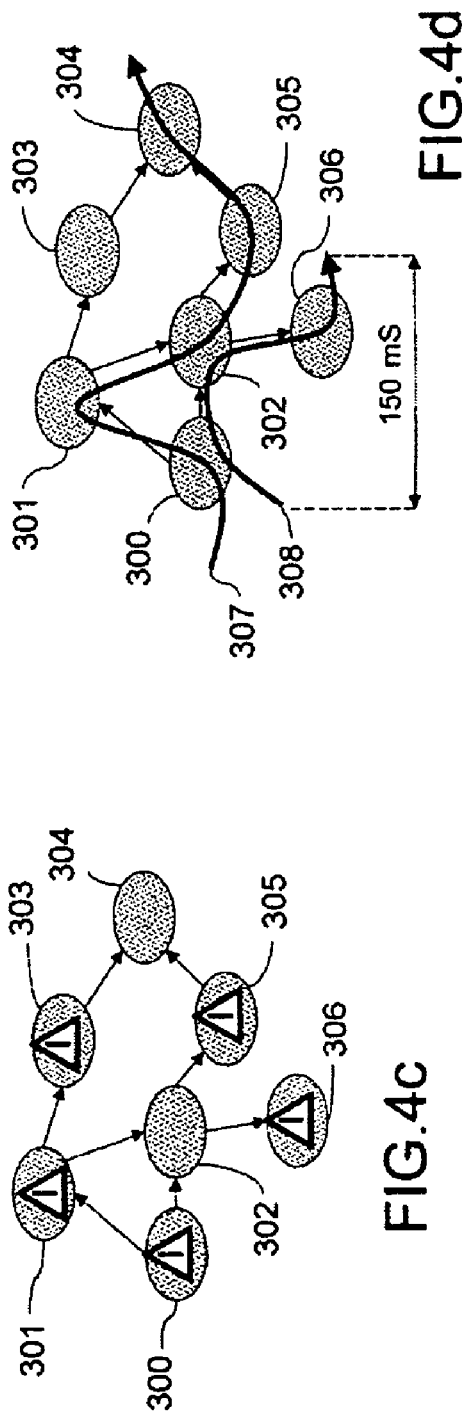
FIG.4b
FIG.4d
FIG.4a
FIG.4c

METHOD TO AID THE DESIGN OF A SYSTEM ARCHITECTURE

CROSS-REFERENCE TO RELATED APPLICATION

The present application claims the benefit of French patent application serial No. 07 07333, filed Oct. 19, 2007 which is hereby incorporated by reference in its entirety.

BACKGROUND OF THE INVENTION

The present invention relates to a method for aiding the design of a system architecture. The design of system architectures notably relates to the field of system engineering. The systems to which embodiments of the present invention applies may be hardware systems, software systems or systems combining hardware and software. Embodiments of the present invention may be implemented within the framework of the realization of a flight and navigation system of an aircraft for example.

The objective of the construction of a system architecture, whether it be hardware, software or both, is notably to decompose the system into a certain number of components which can be sub-systems, software components, calculator, electronic processing boards. The components of the system are subject to the same constraints as the system. The constraints applicable to the system may be:
  functional, such as: functions performed by the system, implementation conditions for the system;
  non-functional, such as: expected performances, an operational availability, safety, and integrity of the system that corresponds to a confidentiality to be guaranteed and to a resistance to external hazards, a maintainability, but also a facility for integration, for re-use and for development.

The maintainability of a system is notably the ease with which it is possible to carry out preventative or curative maintenance on the system in order to guarantee its reliability.

The construction of an architecture best adapted to satisfying one of the constraints of the system is very often not well adapted to satisfying the other constraints of the system. For example, precautions in the design of an architecture aimed at promoting an integrity and an availability of the system often lead to a degradation of the performances of the system. The modification of the architecture designed with respect to a first constraint in order to take into account a second constraint is costly on the one hand and, on the other, leads to an architecture maladapted to the other constraints. It may notably be impossible to adapt an architecture, designed with respect to the first constraint, to the second constraint without degrading the compatibility with the first constraint. The first and the second constraint may then seem to be contradictory.

BRIEF DESCRIPTION OF THE PRIOR ART

An approach commonly employed consists in carrying out a functional analysis of a technical requirement, then in constructing a functional architecture of a system that meets the technical need. The functional architecture is a decomposition into functions allowing the technical requirement to be satisfied. The functions are grouped according to non-formalized criteria such as a functional proximity criterion.

The functional architecture constructed is then subjected to the opinion of various experts in the non-functional constraints. Each expert therefore analyzes, independently of the other experts, the functional architecture from the point of view of one non-functional constraint: for example by performing an analysis from a security point of view. Each expert therefore proffers a unique non-functional point of view specific to his specialty: expected performance criteria, availability and security of operation, integrity, safety, maintainability.

For example, an analysis employing a failure tree construction may be undertaken. A failure tree construction may be applied once a physical architecture has been defined for implementing the functional architecture. A physical architecture for example allows processors or communication means to be defined. The failure tree construction allows to verify that the design chosen for the physical architecture conserves the expected security constraints. If the physical architecture is not adequate for the security constraints, this leads to the necessity of designing a new physical and/or functional architecture satisfying the security constraints. The new architecture may in turn lead to performance problems, for example.

In order to satisfy all the required constraints for the system, it is therefore necessary to develop the architecture according to each point of view of each expert. In a construction process, this implies numerous iterations of the architecture of the system, or even numerous exchanges between the various experts in order to obtain an architecture that, in the end, only very partially satisfies all the expected constraints. Such a process of construction of an architecture therefore proves to be very costly and cumbersome to implement where only mediocre results are obtained.

Another solution for construction of a system architecture can be to employ a functional simulation. Once the architecture has been defined, the non-functional constraints that should be satisfied by the system are evaluated by implementation of a simulation model. For this purpose, the simulation model simultaneously reproduces an application of the architecture and its implementation on an execution platform. The simulation model used should be very detailed, and for this reason is very costly to develop. Moreover, since the simulation model requires a high level of detail in the description of the architecture, it can only be implemented late on in the process of construction of the architecture. At this point, it is then very costly and complex to apply the necessary modifications to the architecture taking into account the constraints that would not be satisfied, or hardly so, by the architecture proposed. Such a solution is not economically viable when it is implemented for a complex system.

SUMMARY OF THE INVENTION

One aim of the invention is notably to assist in the definition of an architecture for a hardware and/or software system, by taking into account constraints likely to condition the definition of the architecture, and by providing an analysis of each choice of architecture with regard to each of those constraints.

For this purpose, the subject of embodiments of the invention is a method for design of an architecture of a system comprising at least the following steps:
  functional and non-functional analysis of a technical requirement with which the system complies;
  modeling of points of view for analysis of the architecture of the system based on the functional and non-functional analysis;
  definition of at least one rule for analysis of the architecture of the system for each analysis point of view;
  construction of a model for the architecture of the system based on the functional and non-functional analysis;

analysis of the model for the architecture of the system by evaluating the analysis rules on the model for the architecture of the system.

The construction of the model for the system architecture can comprise one or more steps for modification of the system architecture. Each modification step being notably followed by a step for analyzing the architecture of the system.

The functional and non-functional analysis, the modeling of the analysis points of view and the construction of the architecture model can be formalized according to a common meta-model and can be linked within a common model.

The functional analysis can comprise a decomposition of a macro-function into functions meeting the technical requirement.

The functional analysis can comprise a determination of functional chains comprising a set of functions activated successively.

The non-functional analysis is for example a determination of a set of constraints applicable to the system, each analysis point of view being associated with a set of constraints.

The non-functional constraints are notably formalized on the functional chains.

The construction of a model of the architecture of the system notably comprises a grouping of the functions into components, all of the components forming part of the model for the architecture of the system.

The construction of a model for the architecture of the system notably comprises an assignment of the components to processors.

The method according to embodiments of the invention is notably adapted to a design of an architecture of a hardware system.

A computer system for design of an architecture of a system allows the method for design of an architecture of a system according to the invention to be implemented.

Embodiments of the invention notably have the main advantage of providing an immediate analysis of the impact of each choice of architecture on all of the constraints of the system. This advantageously allows a compromise between various possible architectures to be rapidly brought to the fore.

BRIEF DESCRIPTION OF THE DRAWINGS

Other features and advantages of embodiments of the invention will become apparent with the aid of the description that follows, given by way of non-limiting illustration, and presented with regard to the appended drawings which show:

FIG. 3a: a first functional result of a first step of the method according to an embodiment of the invention;

FIG. 3b: a second functional result of the first step of the method according to an embodiment of the invention;

FIG. 3c: a third functional result of the first step of the method according to an embodiment of the invention;

FIG. 3d: a non-functional result of the first step of the method according to an embodiment of the invention;

FIG. 4a: a formalization of a performance point of view;

FIG. 4b: a formalization of a failure point of view;

FIG. 4c: a formalization of a criticality point of view;

FIG. 4d: a formalization of a latency point of view;

DETAILED DESCRIPTION

Figure 1:
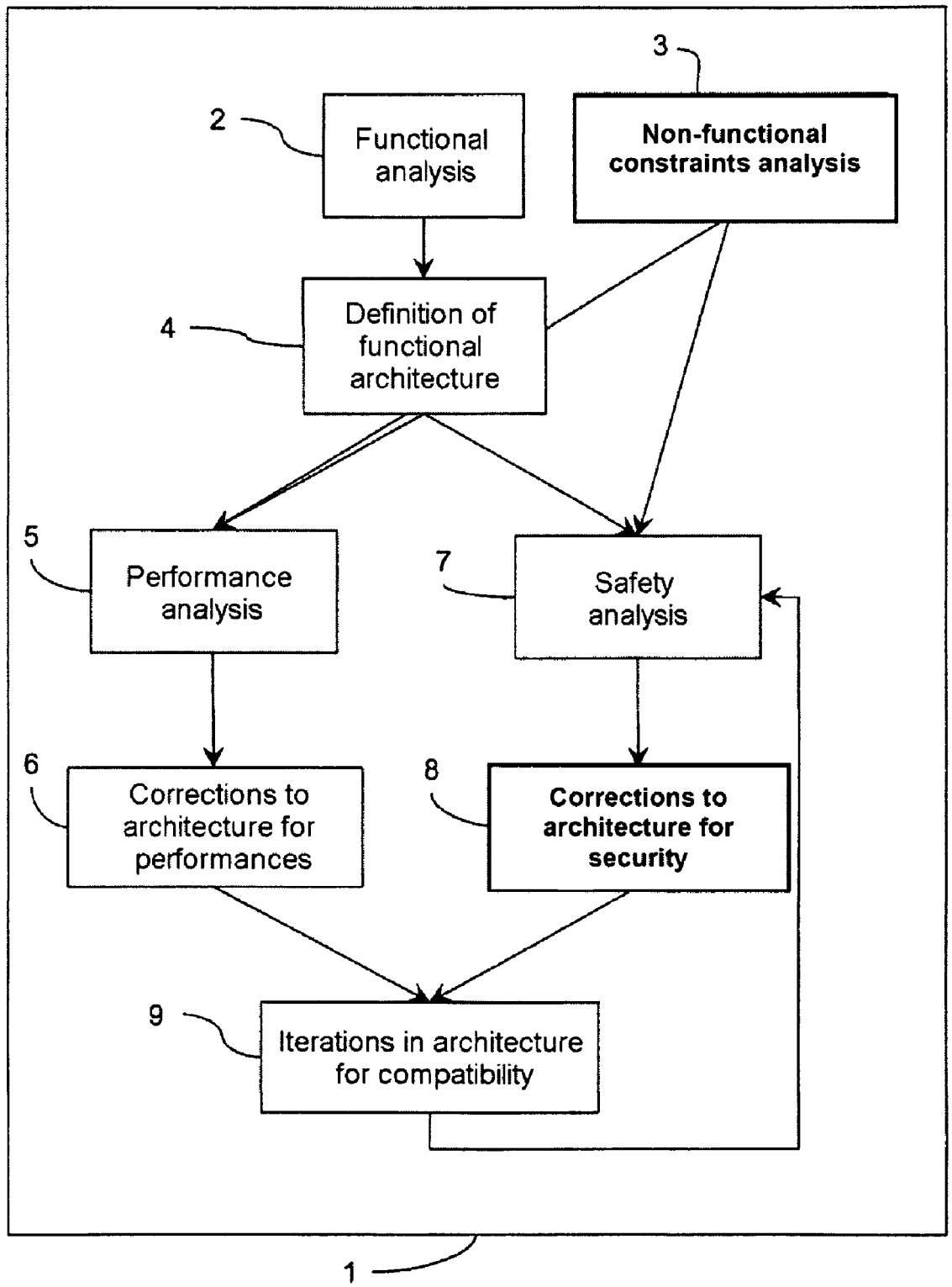
FIG. 1: a method for construction of a system architecture according to the prior art.

FIG. 1 shows a method for design 1 of a system architecture according to the prior art.

A first step 4, 3 of a method for design 1 of an architecture of a system is a step for analyzing a technical requirement. This analysis of the technical requirement can be decomposed into two analyses:

a first analysis 2, called functional analysis 2, allowing identification of functions and the communications to be implemented in order to meet the technical requirements;

a second analysis 3, called analysis of non-functional constraints 3, allowing determination of constraints to be applied to the system such as: expected performances, constraints for operational availability and security of the system, for integrity, for safety and for maintainability, for example.

A second step 4 of the method for design 1 of a system architecture is a step for definition 4 of a functional architecture of the system. The step for definition of the functional architecture 4 of the system uses the functional analysis 2 in order to define functional blocks grouping one or more identified functions. A decomposition into functional blocks is a means for representing a functional architecture of the system.

Once the functional architecture has been defined, the latter is analyzed in parallel under several points of view. Each point of view corresponds to a non-functional constraint identified during the analysis of non-functional constraints 2. For example, a first analysis of the functional architecture may be an analysis of performances 5 of the system. The performance analysis 5 enables identification of first corrections to be applied 6 to the functional architecture in order to better take into account the performance constraints. In parallel, a security analysis 7 may be undertaken on the functional architecture. As a result of the security analysis 7, it may turn out to be necessary to apply second corrections to the functional architecture in order to improve the security of the latter.

Once the corrections for performances 6 and the corrections for security 8 have been carried out on the architecture, an iteration 9 needs to be performed in order to verify the compatibility of the functional architecture after correction with the non-functional constraints. This iteration may lead, for example, to a new analysis from the security point of view 8 of the functional architecture being undertaken. This new security analysis 8 may also lead to corrections on the architecture in order to satisfy the security constraints. A new iteration may then be necessary in order to verify the compliance with the performance constraints 5 by the architecture.

These iterative cycles may thus be numerous before obtaining a functional architecture that satisfies all the non-functional constraints identified. It is sometimes impossible to converge toward an acceptable architectural solution, certain constraints seeming to be contradictory.

Figure 2:
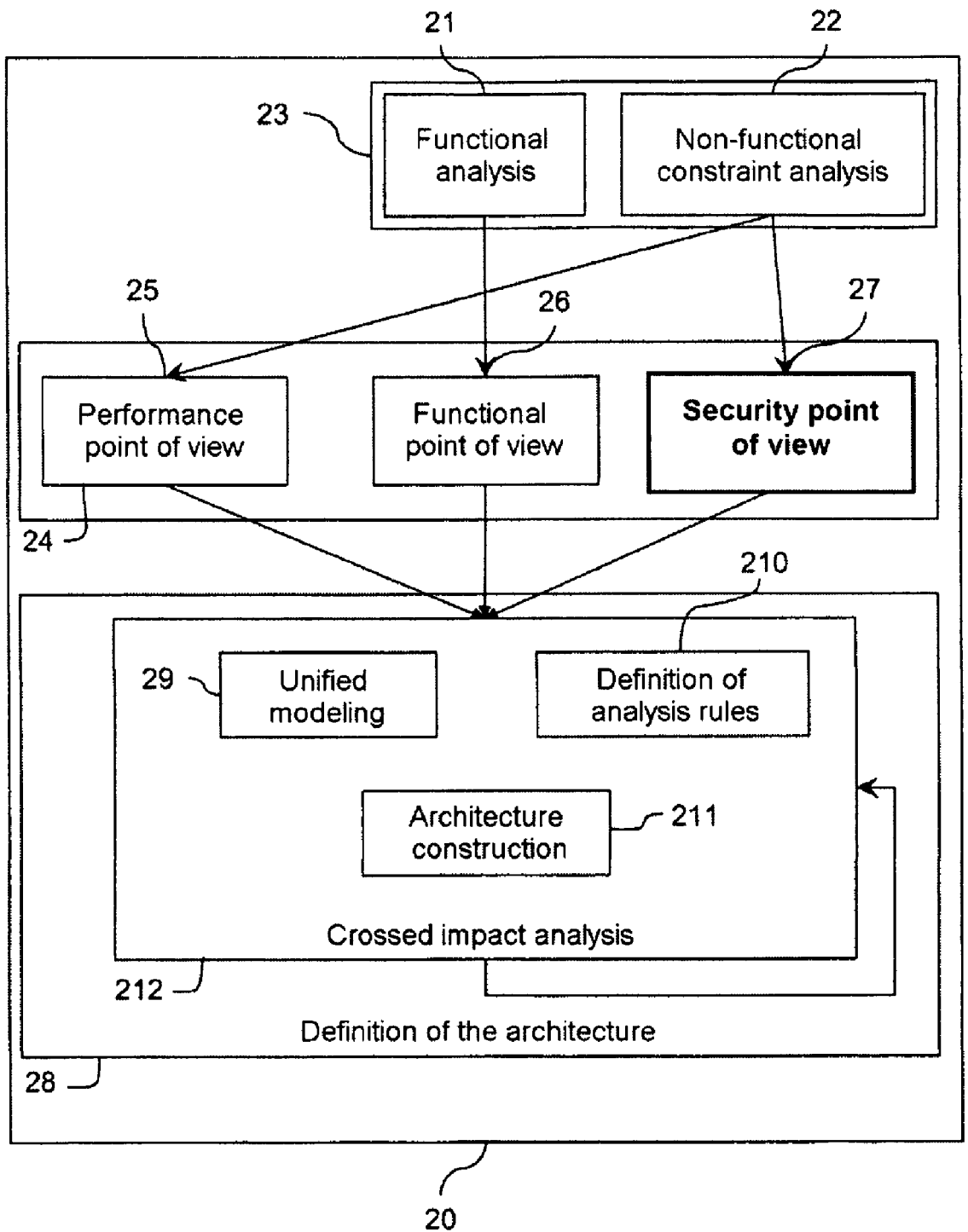
FIG. 2: a general principle of the method for construction of a system architecture according to an embodiment of the invention.

FIG. 2 shows several possible steps of a method for design of a system architecture 20 according to an embodiment of the invention. In the embodiment presented, the system can be a flight and navigation system of an aircraft implementing avionics functions made available to the crew of the aircraft. The method according to the embodiment of the invention may however be applied to other types of system.

A first step of the method for design of a system architecture 20 according to an embodiment of the invention is a step for analysis of a technical requirement 23. The step for analysis of the technical requirement 23 can be decomposed into two sub-steps: a first functional analysis sub-step 21 and a second sub-step for analysis of non-functional constraints 22.

The functional analysis 21 allows a list of functions needed for the system to satisfy the technical requirement to be determined. The list of functions may be represented in the form of a function tree, and of a graph of collaborations between the functions. A function tree allows hierarchical relationships between the functions to be defined; a collaboration graph allows the interactive links between the functions to be defined.

The functional analysis 21 also allows functional chains to be determined. A functional chain comprises a set of functions activated successively, according to a given collaboration graph, in order to achieve an expected capability of the system.

The analysis of non-functional constraints 22 allows the determination of a set of constraints to be satisfied by the system. Non-functional constraints can, for example, be:
  a latency over each functional chain: a set of functions should then be passed through in an imposed time, between an event at the input of the system and a result produced at the output of the system;
  performances linked to the processing resources available, such as an estimation of a processing load and of execution time associated with each function;
  a level of criticality for each function: each function may be qualified according to a level of criticality such as critical, essential, non-critical for example;
  failure propagation conditions in a collaboration graph: a failure in a function may or may not affect the functions with which it collaborates; the functions affected may be more or less severely affected by a failure.

The results of the functional and non-functional analysis can be formalized within a functional and non-functional analysis model. In the framework of an embodiment of the invention, a model is a formalized representation describing various elements generated in the course of the various steps of the design method according to an embodiment of the invention, together with the relationships that unite them, according to a formal language. The formal language used is notably referred to as a meta-model. The meta-model is then common to all the models generated in the course of the design method according to an embodiment of the invention. A model may be defined using computing tools. The computing tools can then analyze the model in order to check that it satisfies the expected properties of the system such as the non-functional constraints.

The functional and non-functional analysis model notably contains, for the functional analysis:
  the functions and the functional chains determined;
  links from a functional chain to the functions composing it;
  the collaboration relationships between the functions;
and for the non-functional analysis: attributes defining the non-functional constraints of the latency type, for example criticality.

A second step 24 of the method for design of a system architecture 20 according to an embodiment of the invention is a step for formalization of various points of view 24 for analysis of the system architecture. A point of view expresses the impacts of a non-functional constraint on the system architecture. The formalization of a point of view is a modeling of the point of view.

A point of view may be modeled on the results of the functional analysis 21. For example, a first point of view on the latencies in the system can be modeled by identifying critical functional chains on a graph of communications between functions, and by assigning to them an expected latency.

A second point of view on the expected performances 26 for the system can be modeled by:
  assigning an estimation of a processing load to each function, in terms of a usage percentage of a processor or of a memory capacity;
  assigning to each communication an estimation in terms of exchange complexity, of frequency, of volume of data exchanged for example;
  defining a reference platform comprising processors and physical means of communication;
  defining resource capacities used by the system, in terms of processing capacity, of memory use, of bandwidth for example.

A third point of view on criticality may be expressed by assigning a level of criticality to each function and to each functional chain.

A fourth point of view on the propagation of failures can be modeled by defining failure propagation links between the functions and propagation equations for each failure in the system.

A fifth point of view may be a security point of view 27.

Other points of view may be defined in relation to other constraints on the system.

Once the second step of the method according to an embodiment of the invention has ended, the analysis points of view 25, 26, 27 are defined and modeled. The points of view can therefore be represented by a model of points of view comprising attributes of the functional chains, of the criticality or latency type.

A third step 28 is a step for definition of the architecture of the system 28. The step for definition of the architecture of the system 28 notably produces a grouping of the functions into components forming part of the architecture of the system. The definition of the system architecture notably allows a model of system architecture to be generated that comprises the components and, for each component, the functions composing them and communication interfaces supporting the collaborations between functions.

The step for definition of the system architecture 28 comprises a step for unification 29 of the models produced during the preceding steps 23, 24. The objective of this model unification step 29 is to bring together and to link the concepts previously defined, such as the points of view, the functions and functional chains and the components into one or more unified models. The unified models allow the mutual influences of the concepts previously defined on the system architecture to be analyzed. A unified model is described according to the meta-model. A meta-model may be defined as a model of a modeling language, in other words a set of concepts manipulated by a user of the modeling language in order to construct models, and the links unite the models.

The modeling carried out within the framework of an embodiment of the invention relies, for example, on the following principles:
- all of the unified models described are compatible with one another;
- each unified model supports a particular point of view such as the performance 24 or the security 27, each point of view being applicable to the system architecture;
- the unified models can be linked together and relate to the same embodiment of a system;
- each unified model is referred to the common meta-model and the uniting of each unified model composes the system architecture.

Thus:
- the functional chains can be linked to the functions and communications through which they pass in a simple manner;
- each function can be assigned to a software or hardware component;
- each component can be projected onto a processor responsible for its execution;
- each communication can be carried by a physical communication means;
- a failure propagation graph can link: the functions to one another, and the processors performing these functions to one another.

Other relationships between unified models may also be made explicit depending on the type of system.

The step for definition of the system architecture 28 also comprises a step for defining rules of analysis 210 of the system architecture. The rules of analysis then enable an analysis of the system architecture to be carried out. Each analysis rule can for example correspond to a non-functional constraint and therefore to a previously identified point of view. By way of example, the following rules can be defined:
- latency of a functional chain: the sum of the execution times for the functions through which the functional chain passes is less than a defined value of latency;
- performances: the sum of the loads of the processors used by each function assigned to a processor is less than 75% of the processing capacity of the processor; the performances may also be defined in terms of volume of memory used or of bandwidth;
- criticality of the functions and of the functional chains: two functions of different criticality cannot co-exist on one and the same functional chain nor on the same component;
- propagation of failures: a failure in a given function should not lead to unavailability of a given functional chain.

The step for definition of the system architecture 28 also comprises a step for construction of an architecture of the system 211. The construction of an architecture of the system 211 can use the functions identified in the course of the functional analysis 21. The construction of a system architecture 211 allows the functions to be grouped into components which then constitute the architecture of the system.

The grouping of the functions into components may be carried out according to functional proximity criteria or according to non-functional criteria, such as the non-functional constraints applicable to the system. For example, functions having the same level of criticality may be assembled within the same component.

The components can be sub-systems, software applications or hardware. The components structure and therefore compose the architecture of the system. The components may themselves be decomposed into sub-components depending on the level of granularity of the architecture.

In the course of the definition of the system architecture 28, the communications between functions can be assigned to communication ports or to interfaces between components. The communications may also be assigned to physical means of communication.

The functions and the components may be assigned to physical resources, such as processors, during the step for construction of the system architecture 211.

The system architecture thus constructed is a model formalized according to the meta-model common to the unified models. The model for the system architecture, together with the unified models previously constructed, form part of one and the same common model, each of the models being able to be linked to the other models.

The step for definition of the system architecture 28 also implements crossed impact analysis 212 which takes into account the rules of analysis 210, the unified models 29 and the constructed architecture 211. The crossed impact analysis 212 may be carried out at each modification of the system architecture, of an analysis rule or of a unified model. The crossed impact analysis 212 allows an architecture to be simultaneously confronted with all of the defined points of view, by referring to the unified models and to the analysis rules defined.

Thus, at each decision taken in the course of the definition of the system architecture 28, the analysis rules 210 are tested on the architecture in order to detect any non-compatibility with the constraints to be taken into account by the system.

For example, a grouping of several functions within a component or the assignment of a function to a given processor can lead to a new analysis 212 of the system architecture.

In the course of the crossed impact analysis, a verification of all of the points of view is carried out at each elementary design decision. The iterations performed are therefore very short and of limited extent, this being made possible by the approach and the properties of the common model.

The validity of the architectural choices can thus be simultaneously evaluated with respect to all of the points of view 25, 26, 27 covered by the analysis rules 210. The consequences of a modification in architecture, in order to satisfy one rule, on the compliance with the other defined rules can also be evaluated.

The analysis of the system architecture 212 allows not only the compliance of the architecture with the constraints to be evaluated, but also the causes to be localized in the eventuality of non-compliance with the constraints. For example, it is thus possible to determine which functional chain exceeds an imposed latency or which processor is saturated and by how much.

This allows the definition of the system architecture 28 to be continually re-adjusted in order to rapidly converge toward an architecture representing a good compromise between the non-functional constraints.

The method for design of a system architecture therefore allows, right from the first design phase, the non-functional constraints to be taken into account and the architecture to be adjusted as a function of the latter. Taking into account the non-functional constraints as early as possible allows the design costs for such an architecture to be reduced and the design process for this architecture to be accelerated.

The method for design of a system architecture according to an embodiment of the invention also allows it to be proven right from the first phases of design that the non-functional constraints are really taken into account. The design according to an embodiment of the invention therefore allows the errors made in taking into account the non-functional requirements to be detected at the earliest and allows them to be remedied in a timely manner.

FIGS. 3a, 3b, 3c and 3d show examples of functional and non-functional results of the first step for analysis of a technical requirement 23.

A first functional result, shown in FIG. 3a, can be a hierarchized functional decomposition of one or more functions to be implemented in order to meet the technical requirement. A first function 30 can be a macro-function representing a main function to be fulfilled by the system. The macro-function 30 can be decomposed into two functions 31, 32 which themselves can be decomposed into two sub-functions 33, 34, 35, 36. A first sub-function 36 can also be decomposed into two other sub-functions 37, 38. It should be noted that a macro-function and a sub-function are functions, the terms macro-function and sub-function simply introducing a notion of hierarchy between the functions.

A second functional result can be a graph of collaboration between the various identified functions shown in FIG. 3b. For example, a second function 300 can supply data required by a third function 301 and by a fourth function 302. The fourth function 302 can also depend on the third function 301. A fifth function 303 can depend on the third function 301 and supply information to a sixth function 304. The sixth function 304 can also depend on a seventh function 305, itself dependant on the fourth function 302. An eighth function 306 can also depend on the fourth function 302. A collaboration graph thus allows communications between the various functions to be defined.

A third functional result can be one or more functional chains 307, 308 shown in FIG. 3c. The functional chains can be represented on a collaboration graph such as that shown in FIG. 3b. A first functional chain 307 activates for example the following functions in the order of citation: the second function 300, the third function 301, the fourth function 302, the seventh function 305, the sixth function 304. A second functional chain 308 can activate the following functions in the order of citation: the second function 300, the fourth function 302, the eighth function 306. Each functional chain provides an expected result within the system.

The analysis of the technical requirements 23 also leads to identifying non-functional constraints that the system takes into account. The non-functional constraints may be represented in the form of a list 307 of constraints, for example written as free text as shown in FIG. 3d.

FIGS. 4a, 4b, 4c and 4d show possible formalizations 24 of various points of view.

For example, FIG. 4a shows a performance point of view projected onto the functional decomposition shown in FIG. 3a. For example, a ninth function 31 should not use, during its execution by a processor, more than 40% of the processor load. The second sub-function 35 should not use more than 30% of processor load during its execution. In another representation of the performances, the third sub-function 38 should carry out its processing operations in 20 ms, ms meaning milliseconds, whereas the fourth sub-function 34 should carry out its processing operations in 30 ms.

FIG. 4b presents an exemplary representation of a failure point of view. For this purpose, FIG. 4b shows a propagation of failures on a functional collaboration graph such as is shown in FIG. 3b. For example, a failure occurring in the third function 301 can lead to failures in the fourth function 302 then in the eighth function 306. A failure in the third function 301 can also generate a failure in the fifth function 303 then in the sixth function 304. A first path 40 and a second path 41 of propagation of failures between the functions may thus be traced on the collaboration graph.

FIG. 4c presents an exemplary representation on a collaboration graph, such as is shown in FIG. 3b, of a criticality point of view. For example, if two levels of criticality are defined: critical and non-critical, the following functions can be critical: the second function 300, the third function 301, the fifth function 303, the seventh function 305 and the eighth function 306.

FIG. 4d shows, on a collaboration graph comprising functional chains, such as is shown in FIG. 3c, a latency point of view. For example, for the second functional chain 308, the maximum acceptable latency time should be equal to 150 ms.

Figure 5:
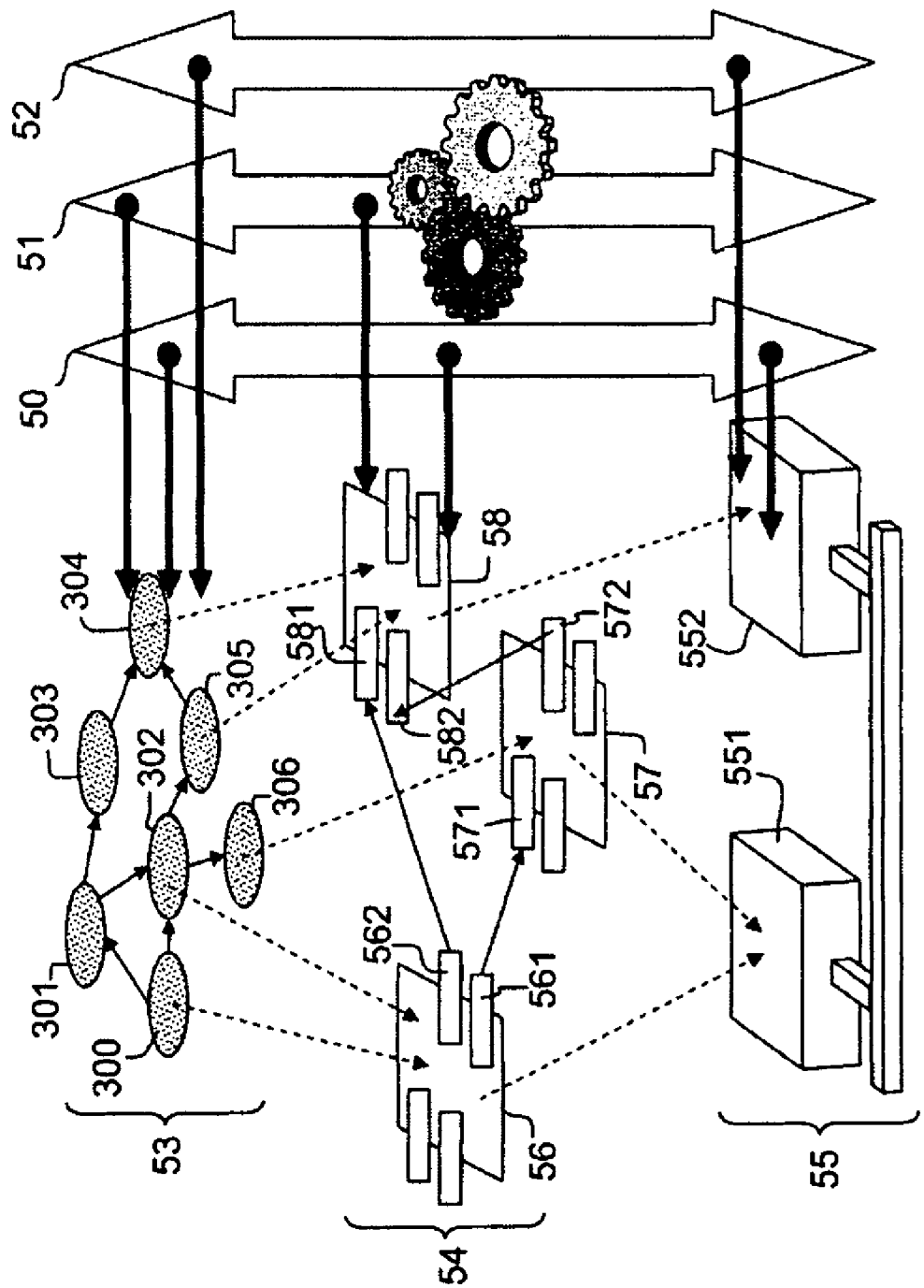
FIG. 5: various phases in the design of a system architecture employing the method according to an embodiment of the invention.

FIG. 5 shows various iterative phases 53, 54, 55 of a design of a system architecture using the method according to an embodiment of the invention. The analysis of the architecture 212 is represented by doubles arrows 50, 51, 52, each double arrow 50, 51, 52 representing a point of view and an analysis rule associated with this point of view. A first rule is for example a latency rule 50, a second rule may be a criticality rule 51 and a third rule is a rule for propagation of failures 52, for example.

In a first design phase, the various functions of the system can be determined. The various functions 300, 301, 302, 303, 304, 305, 306 are represented by a collaboration graph 53, such as is shown in FIG. 3b. In this step, the functional and non-functional constraints, to which the architecture should adhere, are expressed.

Once the functions have been defined, they can be generated by a set of components 54, for example software components. For example, the following functions may be assigned to:

a first component 56: the second function 300, the fourth function 302;

a second component 57: the eighth function 306;

a third component 58: the seventh function 305, the sixth function 304.

The components 56, 57, 58 may be linked by means of their interfaces 561, 562, 571, 572, 581, 582. For example: a first interface 561 of the first component 56 is linked to a second interface 571 of the second component 57, a third interface 562 of the first component 56 is linked with a fourth interface 581 of the third component 58, and a fifth interface 572 of the second component 57 is linked with a sixth interface 582 of the third component 58.

The components 56, 57, 58 can then be projected onto two physical processors 55, for example. The first component 56 and the second component 57 can be projected onto a first processor 551, and the third component 58 can be projected onto a second processor 552.

The analysis of the architecture according to the first latency rule 50 and according to the third rule for failure propagation 52 uses the information from the functional analysis and their assignment to components, together with the projection of the components onto the physical processors.

The analysis of the architecture according to the second criticality rule 51 notably uses the information from the functional analysis and their assignment to components.

Thus, the design method enables an analysis of the system architecture at various degrees of maturity of the latter. This allows the architectural choices to be immediately validated, without having to wait for a certain degree of design maturity of the architecture. This validation of the architectural choices allows a gain in the time and cost of design. Indeed, a delayed validation of architectural choices leads to high costs in order to make the architecture conform to a desired one.

FIGS. 6a, 6b, 6c, 6d, 6e, 6f, 6g, 6h, 6i, 6j show an example of implementation of the method for design of a system architecture according to an embodiment of the invention applied to an on-board navigation avionics system. The on-board navigation system can be formed by an on-board computer. The implementation of the method for system architecture design according to an embodiment of the invention can be carried out by means of a software tool allowing notably the various models associated with the non-functional constraints together with an architecture model to be constructed. The software tool can thus take into account the various analysis rules in order to carry out an analysis of a given architecture automatically.

Figure 6A:
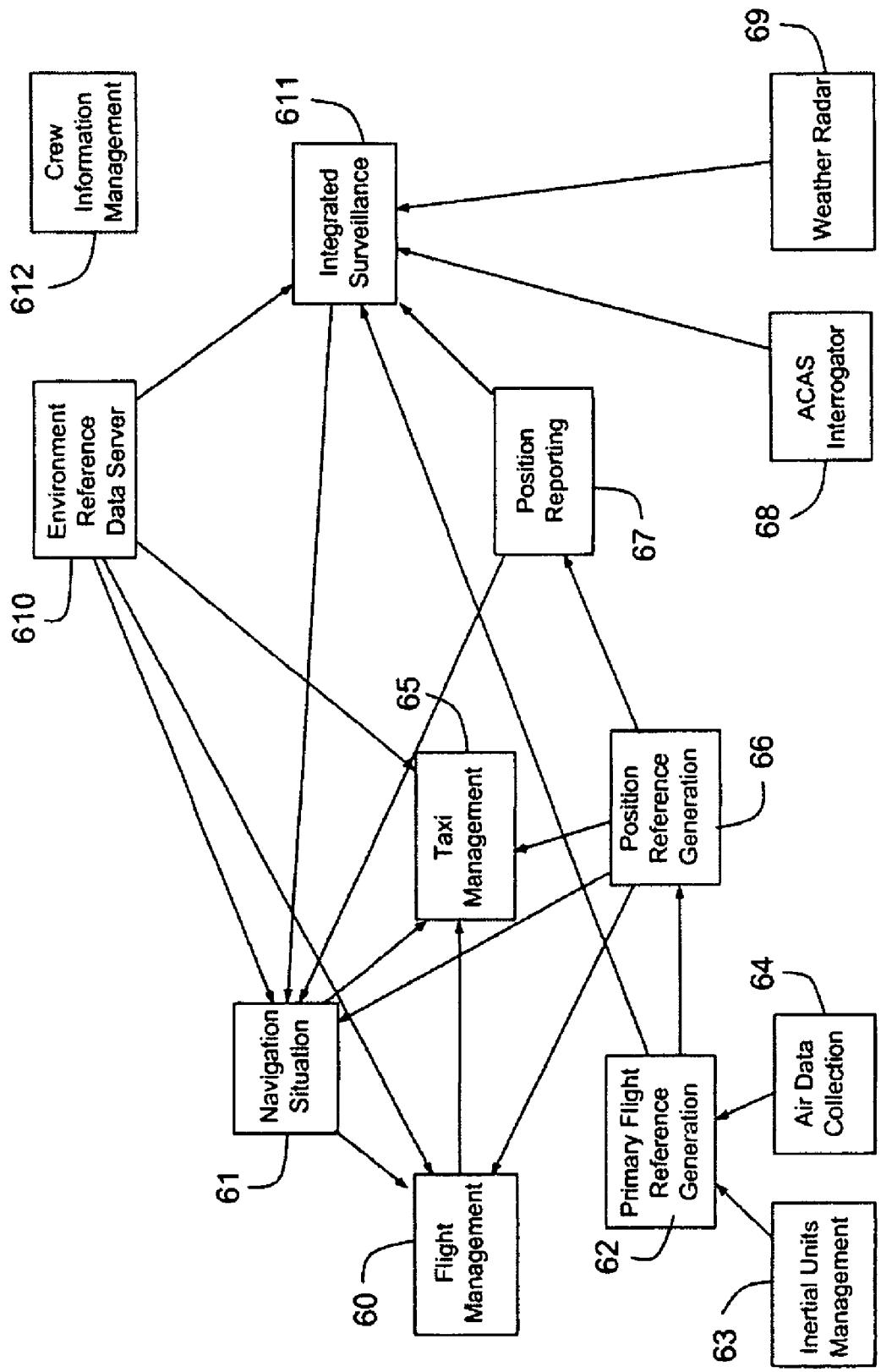
FIG. 6a: an example of a collaboration graph.

FIG. 6a shows a first step in the exemplary use of the method according to the invention. The first analysis step 23 allows the avionics functions necessary for the generation of the avionics system to be determined. The avionics functions are shown in FIG. 6a. Each avionics function is shown in a collaboration graph. Each avionics function is denoted according to one of the following expressions:

flight management 60;
navigation situation 61, meaning determination of a position and of a route for an aircraft, from a flight plan for example;
primary flight reference generation 62, meaning generation of primary flight parameters such as an attitude, an altitude, an airspeed of the aircraft;
inertial units management 63, meaning management of the inertial units for positioning of the aircraft;
air data collection 64, meaning management of the collection of data of the barometric type such as a speed, an altitude, a sideslip for example;
taxi management 65, meaning management of the taxiing on the tarmac;
position reference generation 66;
position reporting 67;
ACAS interrogator 68, meaning interrogator of the anti-collision system;
weather radar 69;
environment reference data 610, meaning management of the reference environmental data such as ground, airport, navigation aid data bases;
integrated surveillance 611, meaning integrated surveillance of the aircraft and of the near traffic;
crew information management 612.

These avionics functions are given by way of example and partially represent the navigation system.

The collaboration graph can be constructed with the aid of the software tool. Indeed, the tool can allow the various avionics functions to be simply defined and the dependency links between the avionics functions to be established.

Constraints determined based on a technical requirement allow identification of the evaluation points of view for the architecture of the avionics system such as a functional point of view, a functional chains point of view, an interface point of view, a processing resource utilization point of view, a security point of view, a failure propagation point of view. Each point of view may be defined by a representation based on the functional information already generated.

Figure 6B:
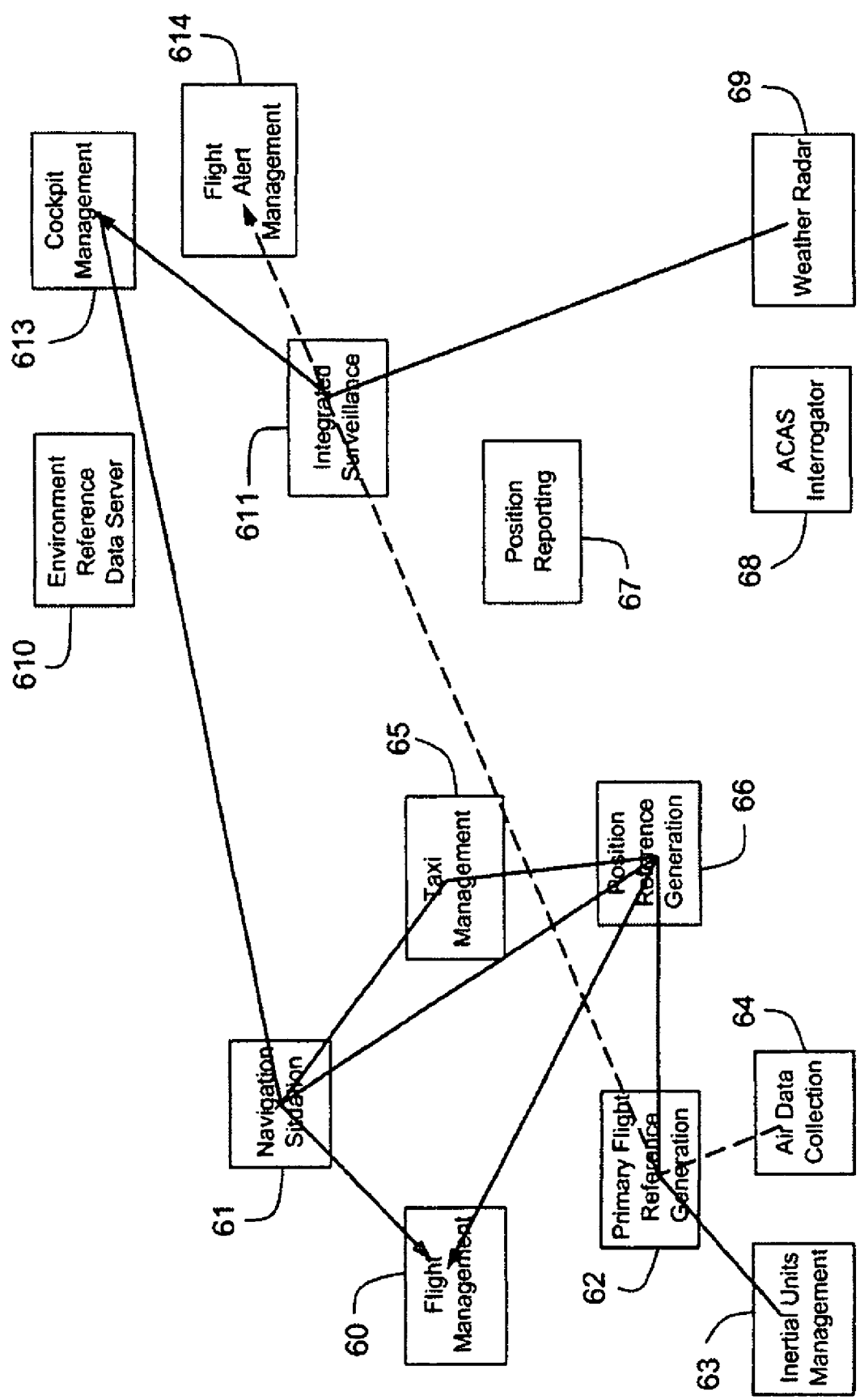
FIG. 6b: an example of a modeling of functional chains.

FIG. 6b shows an exemplary modeling of functional chains using the avionics functions previously defined. A functional chain corresponds to a series of functions for processing a given operational case. For example, a functional chain for the avionics system includes the following functions: air data collection 64, primary flight reference generation 62, integrated surveillance 611, flight alert management 614.

Figure 6C:
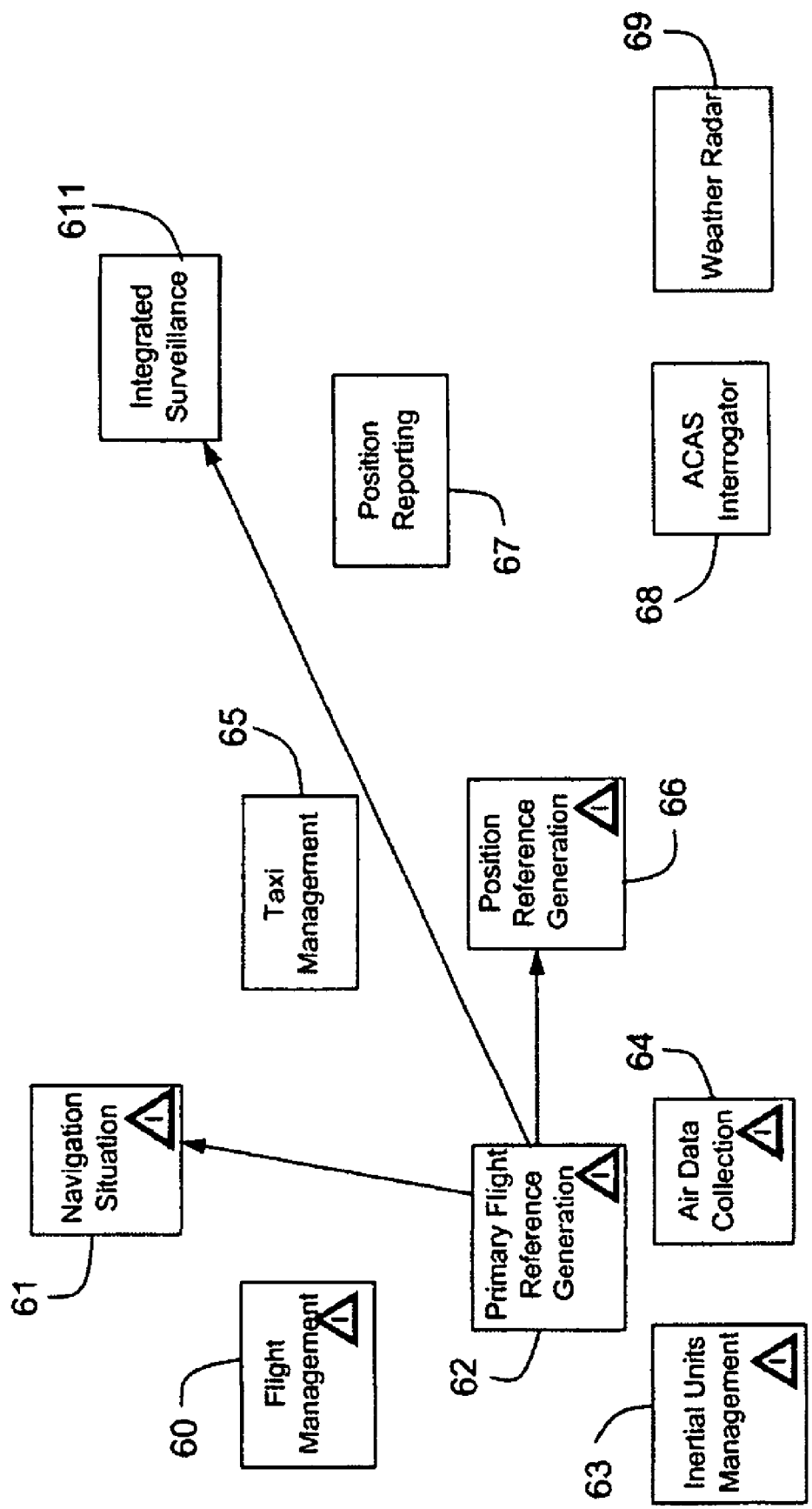
FIG. 6c: an example of joint modeling of a failure point of view and of a criticality point of view.

FIG. 6c shows an example of a joint modeling of a failure propagation point of view and a criticality point of view. The criticality point of view may be represented by a danger sign on the critical level functions. In FIG. 6c, the critical functions are for example the following functions: flight management 60, navigation situation 61, primary flight reference generation 62, inertial units management 63, air data collection 64, position reference generation 66.

The propagation of the failures may be represented by linking the functions in which the failures propagate by arrows. A failure in the air data collection function 64 leads for example to a failure in the primary flight reference generation function 62. A failure in the primary flight reference generation function 62 leads to the occurrence of a failure in the following functions: navigation situation 61, position reference generation 66, integrated surveillance 611. A failure in the position reference generation function 66 can then lead to a failure in the position reporting function 67.

Figure 6D:
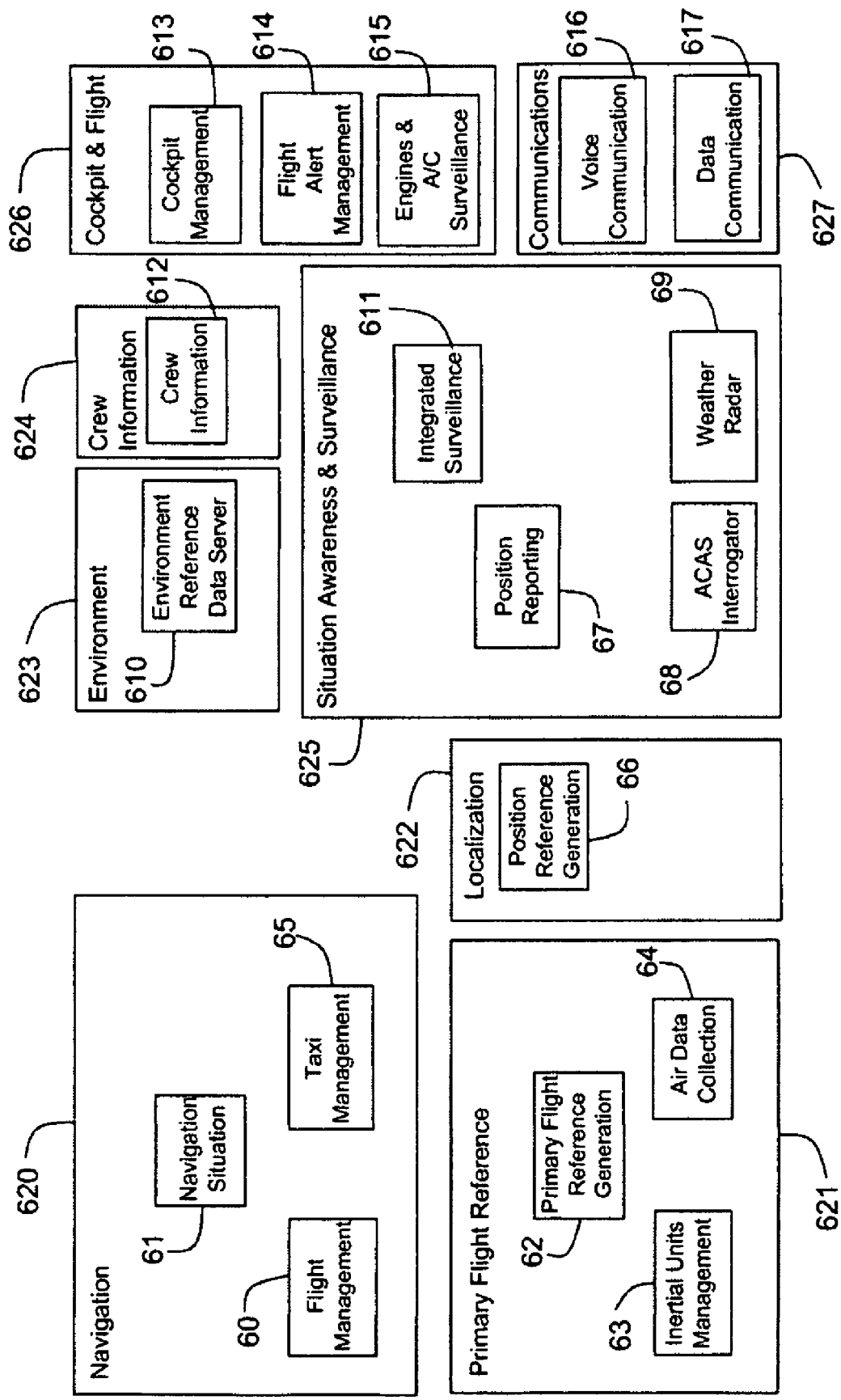
FIG. 6d: an example of system architecture.

FIG. 6d shows a candidate architecture according to a functional coherence point of view. The functions are thus grouped into several components 620, 621, 622, 623, 624, 625, 626, 627 according to the nature of the processing that they perform. For example, eight components 620, 621, 622, 623, 624, 625, 626, 627 may be defined each grouping one or more functions:

a first navigation component 620 groups the functions: flight management 60, navigation situation 61, taxi management 65;
a second component called primary flight reference 621, groups the functions: primary flight reference generation 62, inertial units management 63, air data collection 64;
a third component called localization 622, comprises the position reference generation function 66;
a fourth component called environment 623, comprises the environment reference data function 610;
a fifth component called crew information 624, comprises a function called crew information 612;
a sixth component called situation awareness & surveillance 625, comprises the functions: position reporting 67, ACAS interrogator 68, weather radar 69, integrated surveillance 611;
a seventh component called cockpit & flight 626, comprises the following functions: cockpit management 613, flight alert management 614, engines & A/C surveillance 615, A/C representing 'aircraft';
an eighth component called communications 627 comprises the following functions: voice communication 616, data communication 617.

The components could also be decomposed into sub-components.

Figure 6E:
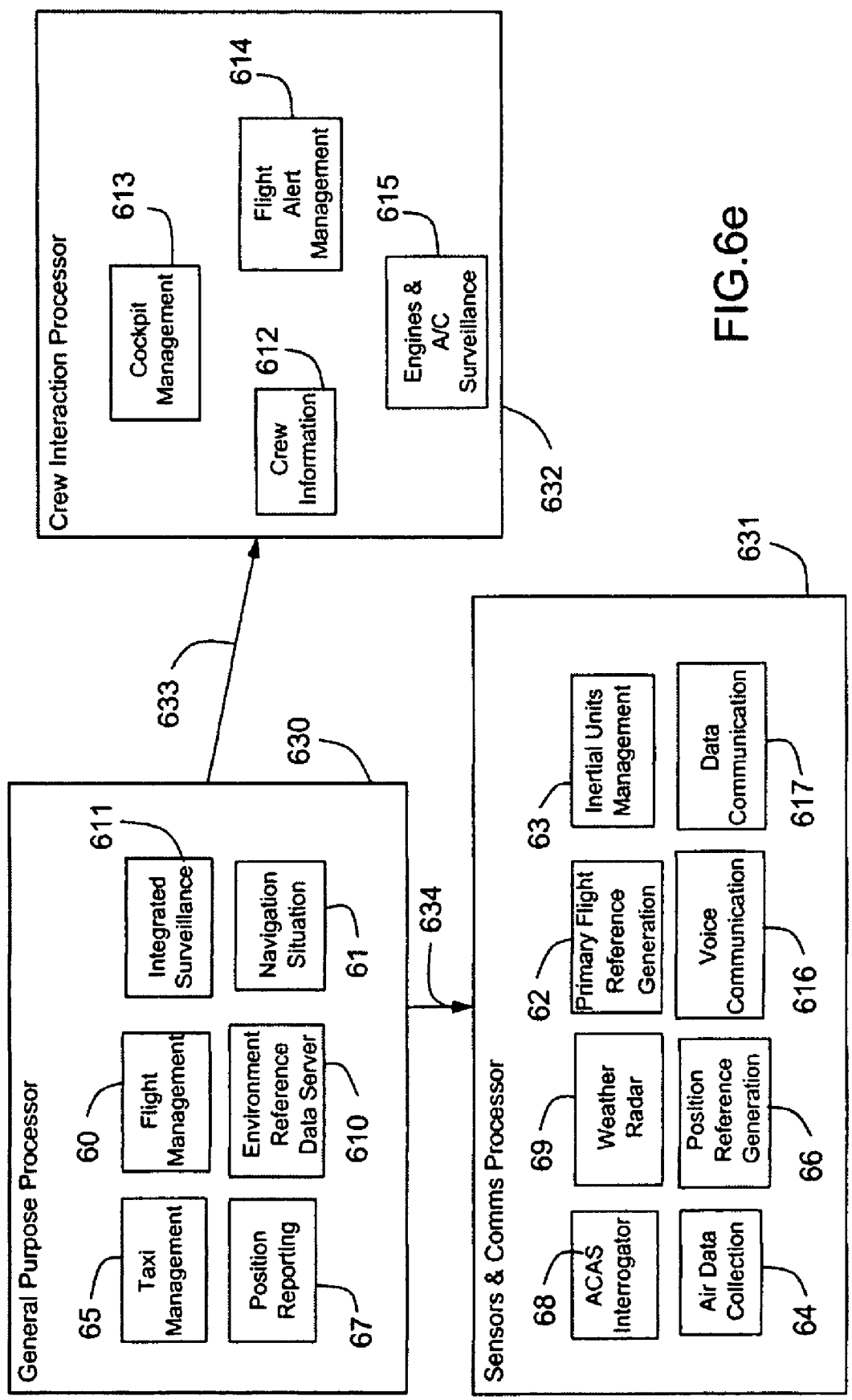
FIG. 6e: an example of assignment of functions to physical resources.

FIG. 6e shows an example of assignment of avionics functions to physical resources such as processors. For example, in FIG. 6e, three processors 630, 632, 631 are shown:

a first processor 630, called general purpose processor 630, processes the following functions: taxi management 65, flight management 60, position reporting 67, environment reference data 610, integrated surveillance 611, navigation situation 61;
a second processor 631, called sensor & comms processor 631, processes the following functions: primary flight reference generation 62, inertial units management 63, air data collection 64, position reference generation 66, ACAS interrogator 68, weather radar 69, voice communication 616, data communication 617;

a third processor 632, called crew interaction processor 632, processes the following functions: crew information 612, cockpit management 613, flight alert management 614, engines & A/C surveillance 615, The communications between the various avionics functions can be assigned to communications ports or interfaces for the components and also to physical means of communication 633, 634 between processors, for example.

Figure 6F:
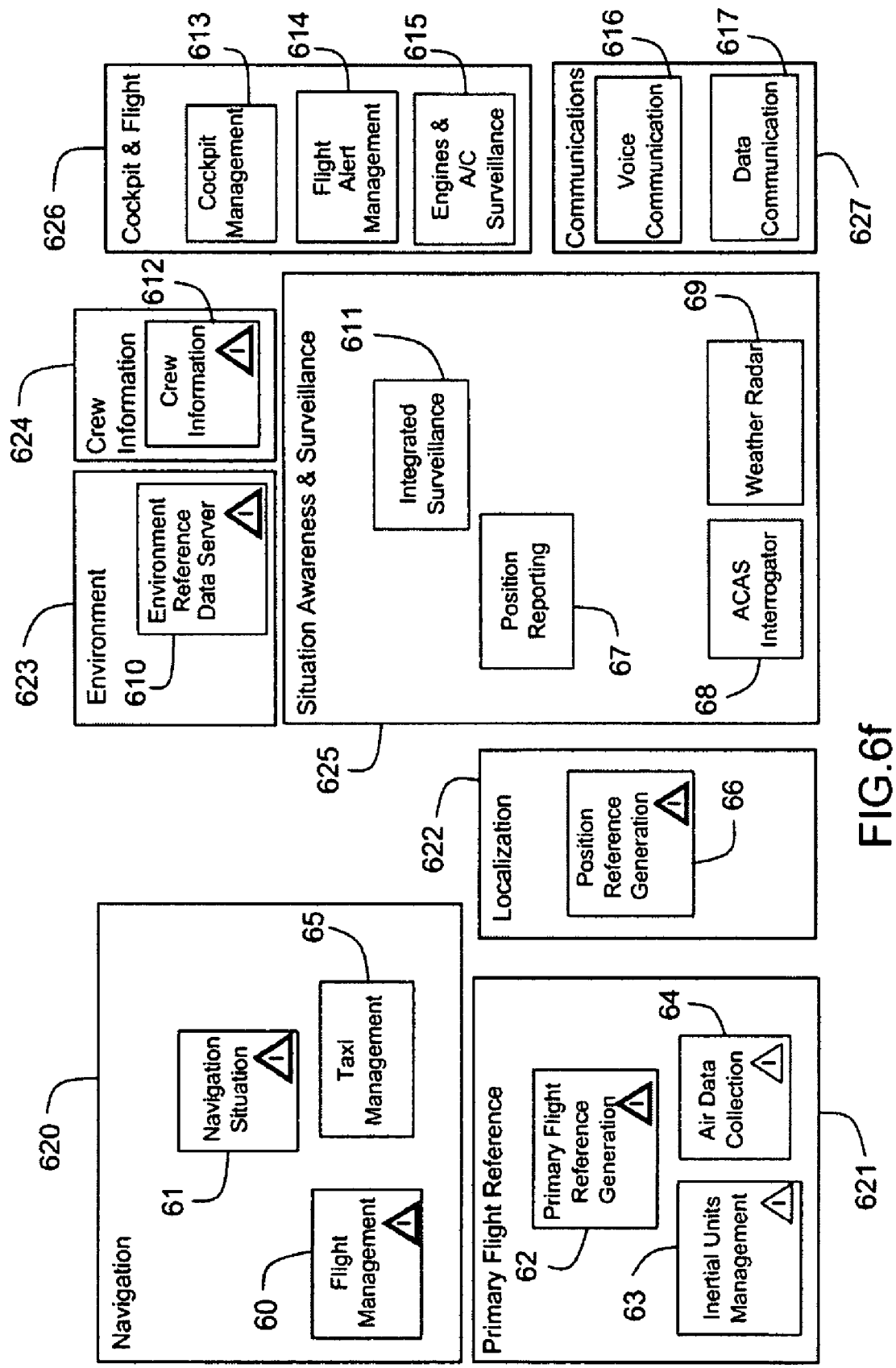
FIG. 6f: an example of analysis of the architecture following a criticality rule.

FIG. 6f shows an example of verification of a criticality rule for the avionics functions. The criticality rule verified may for example be: two different criticality functions cannot co-exist within one and the same component. This criticality rule is not, for example, followed by the navigation component 620. The functions navigation situation 61 and flight management 60, forming part of the navigation component 620, are critical, whereas the taxi management function 65, also forming part of the navigation component 620 is not critical. The navigation component 620 does not therefore comply with the criticality rule.

Figure 6G:
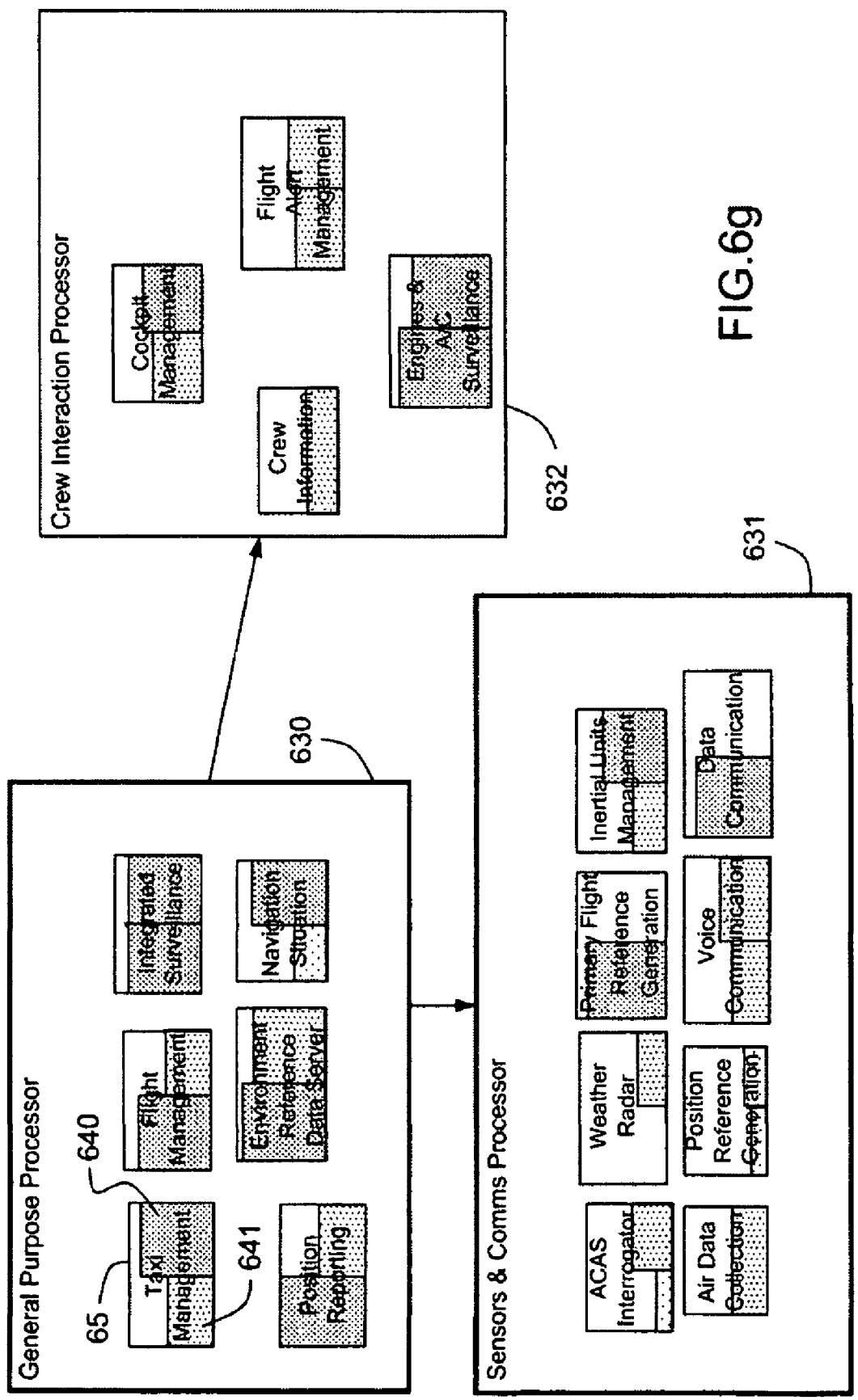
FIG. 6g: an example of analysis of the architecture following a performance rule.

FIG. 6g shows an example of verification of a performance rule when the functions are physically assigned to processors. For example, for each function, a first rectangle 640 is shown whose height indicates the usage percentage of the processor, for example: the processor 'general purpose processor' 630, during processing of the taxi management function 65, utilizes the processor to a level of over 50%. A second rectangle 641 can represent a percentage of memory required for the processing of the function. For example, the taxi management function 65 uses approximately 50% of the memory. Thus, for each function, the usage level of the processor and the percentage of memory used can be represented. If the performance rule is: the functions assigned to a processor should not demand more processing resource than the processor has available, for example, the general purpose processor 630 and sensors & comms processor 631 break the performance rule. The distribution of the functions assigned to the processors should then be reviewed in order to satisfy the performance rule as stated. A processor, as shown in FIG. 6i, can then be added: a spare processor 650. The assignment of the functions to the processors are then modified. For example, the position reporting 67, environment reference 610 and navigation situation 61 functions, previously assigned to the general purpose processor 630, are now assigned to the spare processor 650. An immediate verification of the previous performance rule then shows that it is now satisfied.

Figure 6H:
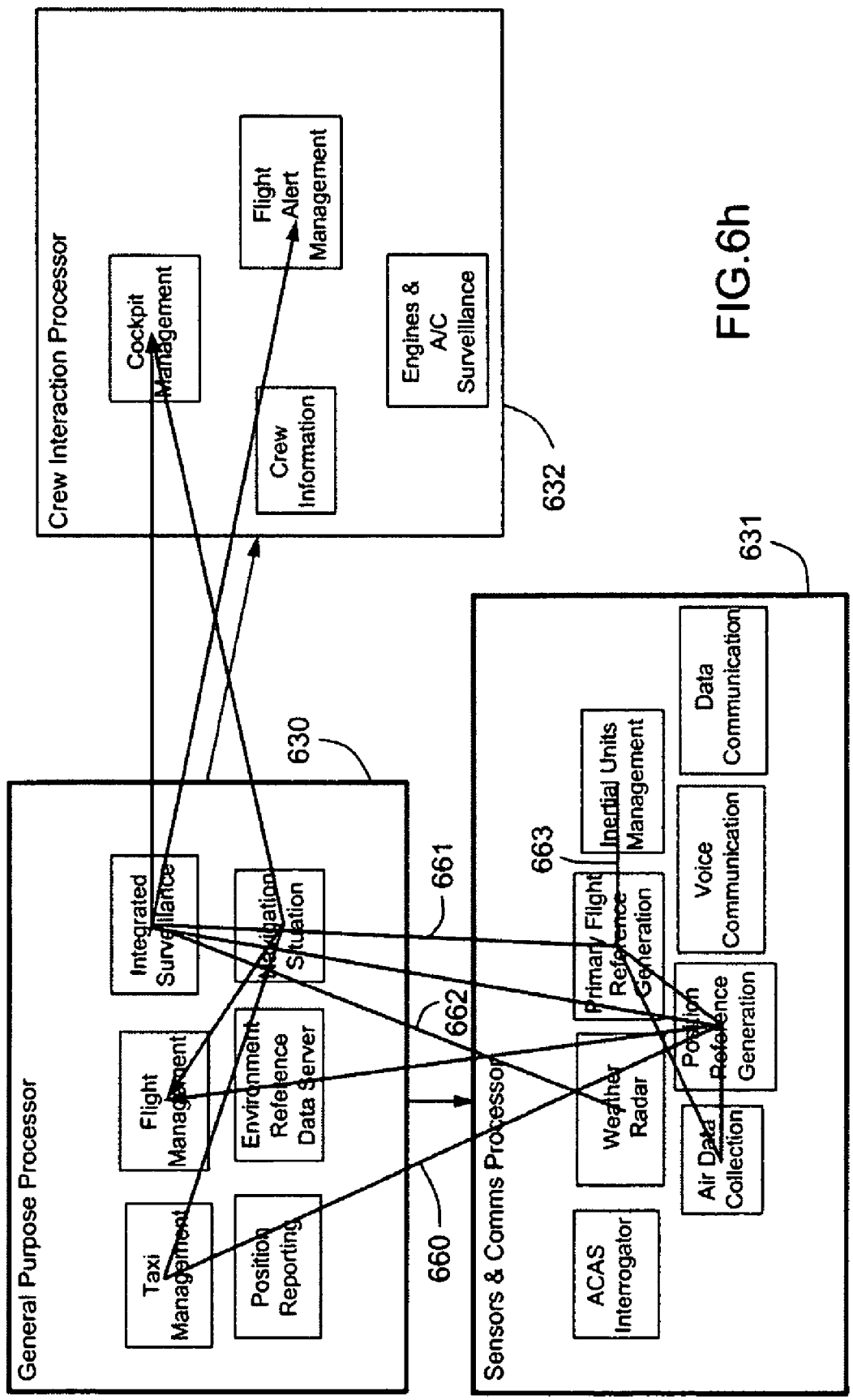
FIG. 6h: functional chains linking functions assigned to three processors.
Figure 6I:
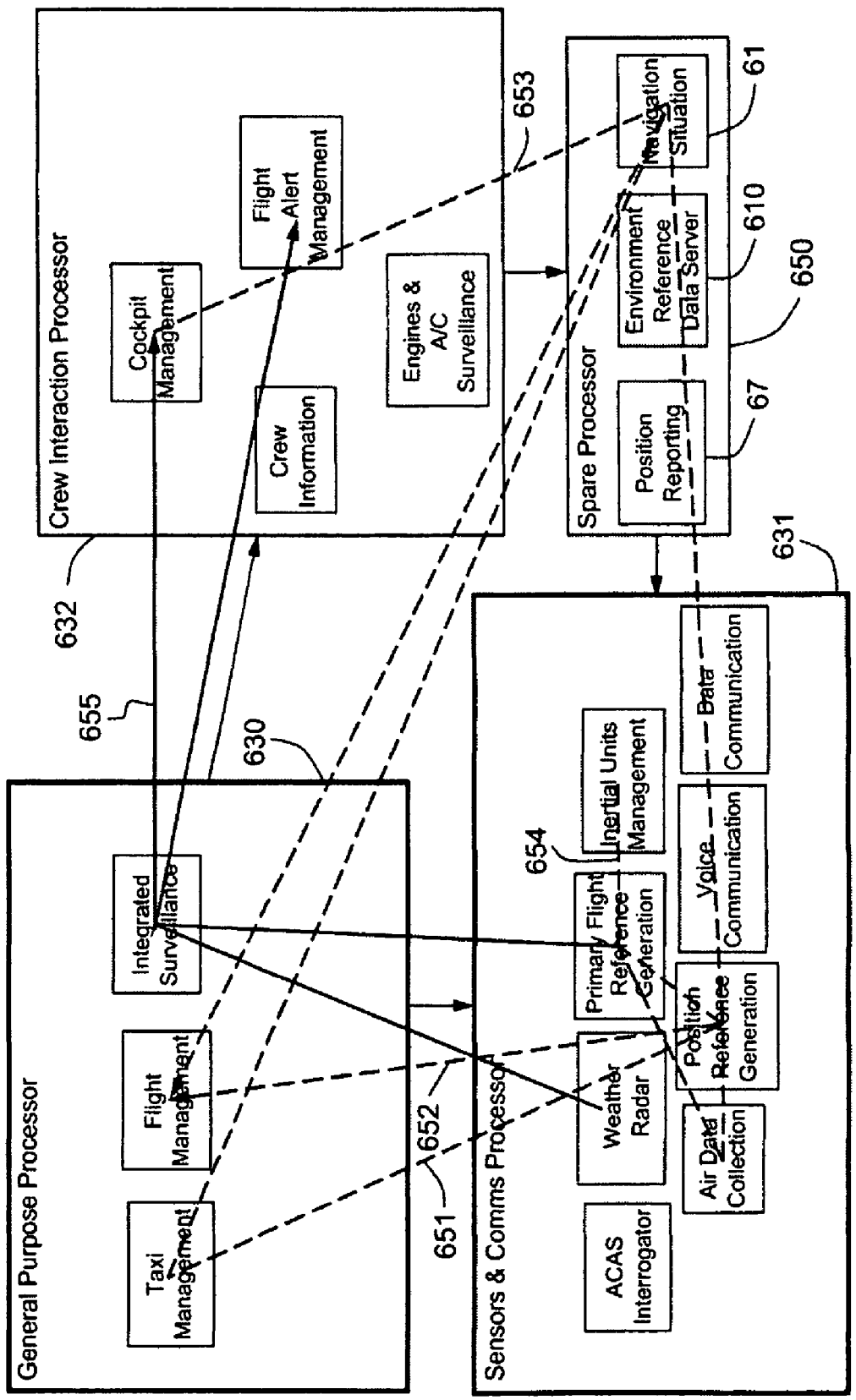
FIG. 6i: functional chains linking functions assigned to four processors.

FIG. 6h shows functional chains 660, 661, 662, 663 associated with the avionics functions allocated over three processors 630, 631, 632.

FIG. 6i also shows functional chains 651, 652, 653, 654, 655 associated with the same avionics functions allocated over four processors 630, 631, 632, 650. The functional chains are degraded by the passage through four processors: the functional chains pass through too many processors. The idea is therefore to find an architecture that represents a satisfactory compromise between degraded functional chains and overloaded processors.

The design method according to the invention therefore advantageously allows the compliance of an architecture with the non-functional constraints to be evaluated, but also the transgressions of the constraints to be localized: for example, it is easy to identify which functional chain exceeds an imposed latency, which processor is saturated and by how much in percentage usage of the processor, for example. This allows the architecture to be continually re-adjusted in order to rapidly converge toward the best attainable compromise.

Figure 6J:
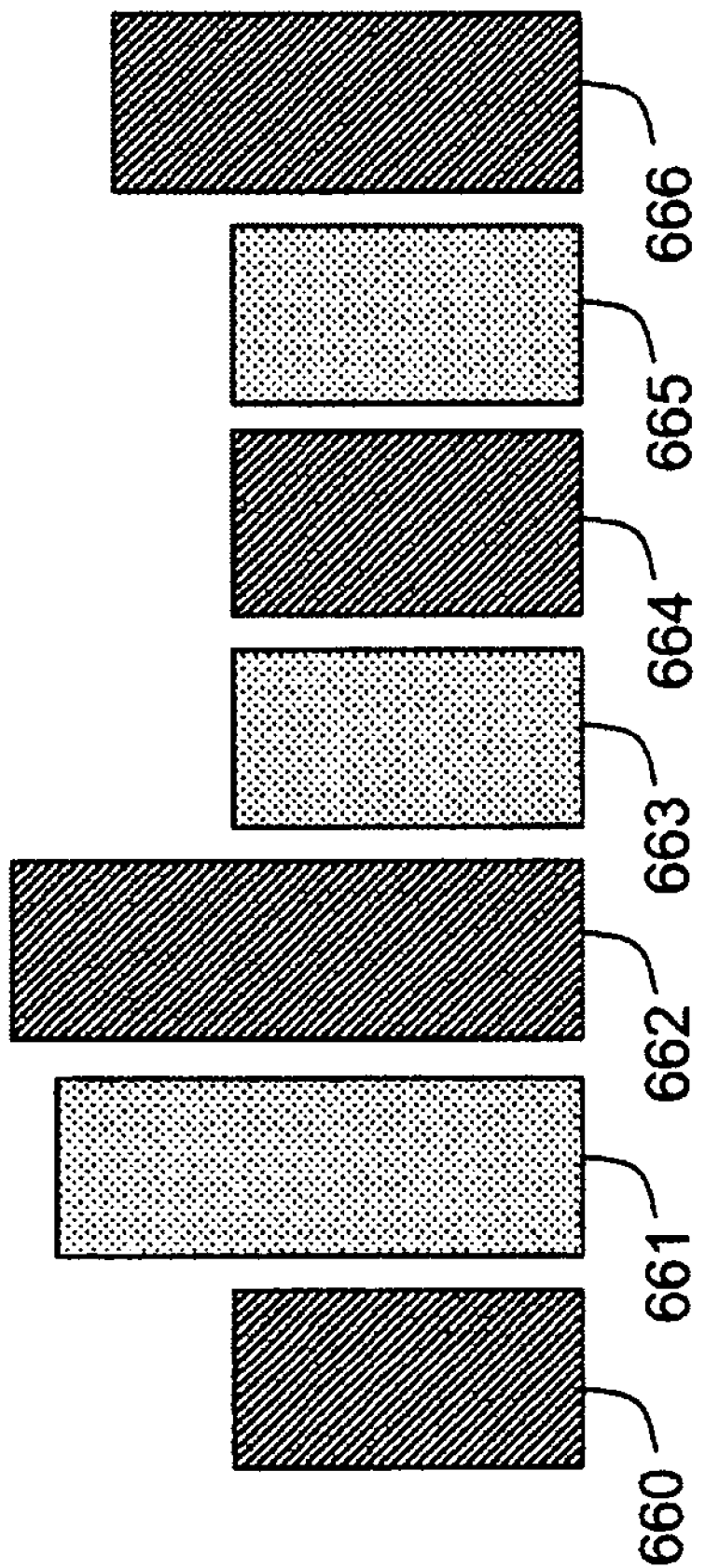
FIG. 6j: an example of histogram of compliance with the analysis rules.

FIG. 6j shows an example of histogram of satisfaction of the analysis rules that may be produced by the software tool.

One histogram bar can, for example, symbolize a percentage of satisfaction of a given rule by a candidate architecture. For example:
- a first bar 660 can represent the satisfaction of a rule relating to the number of interfaces;
- a second bar 661 can represent the satisfaction of a rule for complexity of a functional chain;
- a third bar 662 can represent the satisfaction of a rule for tolerance to a fault;
- a fourth bar 663 can represent the satisfaction of a security rule;
- a fifth bar 664 can represent the satisfaction of a rule for usage of the processors;
- a sixth bar 665 can represent the satisfaction of a rule for utilization of the memory;
- a seventh bar 666 can represent the satisfaction of a rule relating to communications.

A comparison can for example be made between two histograms constructed from an analysis of two different architectures in order to judge which one represents the better compromise between the various analysis rules. The histograms allow the qualities of a candidate architecture to be effectively summarized and immediately provide information on the secondary effects of a choice of architecture on the various points of view.

The method for design of a system architecture according to the invention allows an optimization of a system architecture to be facilitated by taking into account multiples constraints.

The method according to the invention advantageously allows an acceptable compromise between the constraints to be brought to the fore.

The invention is an aid to the definition of a system architecture of significant size, thus allowing a simplified management of the complexity of the architecture so as to allow a system architect to grasp only the general problems of architectural choices.

The implementation of the design method according to an embodiment of the invention using a software tool advantageously allows criteria for choice of architecture to be accumulated and the chosen architecture to be justified. The various steps of the design approach can also be accumulated so as to be reused within the framework of a new architecture design, for example. Thus, the following may easily be accumulated:
- formalized points of view;
- rules of analysis by point of view and confrontation criteria for a point of view, for example defining a criteria that is preponderant with respect to another criterion if a compromise between two criteria needs to be made;
- reusable elements of architectural description, also referred to as architectural patterns.

The method according to an embodiment of the invention offers a unified and informative vision of a system architecture. The system architecture may thus be considered according to a particular point of view or according to multiple points of view in order to evaluate the contribution of all of the points of view to the construction of the architecture. The method according to the invention can thus be considered as a control dashboard for a system architect thanks to which he is able to evaluate the impact of each of the architecture modification decisions.

The method according to the invention may advantageously be implemented in various technical fields in which a system architecture needs to be designed under constraints.

The invention claimed is:

1. A method for design of an architecture of a system carried out by means of a software tool being executed by one or more processors, comprising the steps of:
   functionally analyzing a technical requirement with which the system complies, to produce a functional analysis;
   non-functionally analyzing a technical requirement with which the system complies, to produce a non-functional analysis;
   modeling points of view for analysis of the architecture of the system based on the functional analysis and the non-functional analysis, to produce an analysis point of view;
   defining at least one rule for analysis of the architecture of the system for each analysis point of view, to produce one or more analysis rules;
   constructing a model of the architecture of the system based on the functional analysis and the non-functional analysis; and
   automatically analyzing and verifying the model of the architecture of the system by the software tool through evaluation of the analysis rules upon the model for the architecture of the system.

2. The method as claimed in claim 1, wherein the step of constructing the model of the system architecture comprises the steps of:
   modifying the system architecture, to produce a modified system architecture; and
   automatically analyzing the modified system architecture.

3. The method as claimed in claim 1, wherein the steps of functionally analyzing, non-functionally analyzing, modeling points of view, and constructing a model are formalized according to a common meta-model and are linked within a common model.

4. The method as claimed in claim 1, wherein the step of functionally analyzing comprises a step of decomposing a macro-function into functions meeting the technical requirement.

5. The method as claimed in claim 4, wherein the step of functionally analyzing comprises a step of determining functional chains that include a set of functions activated successively.

6. The method as claimed in claim 5, wherein the step of non-functionally analyzing comprises the step of determining a set of non-functional constraints applicable to the system, wherein each analysis point of view is associated with the set of non-functional constraints.

7. The method of claim 6, wherein the non-functional constraints are formalized over the functional chains.

8. The method as claimed in claim 1, wherein the step of constructing a model of the architecture of the system comprises the step of grouping the functions into components, wherein all of the components form part of the model for the architecture of the system.

9. The method as claimed in claim 8, further comprising the step of assigning the components to processors.

10. The method as claimed in claim 1, further comprising the step of adapting the method to a design of an architecture of a hardware system.

11. A programmed processor, with memory storing instructions, to perform the steps of:
    functionally analyzing a technical requirement with which the system complies, to produce a functional analysis;
    non-functionally analyzing a technical requirement with which the system complies, to produce a non-functional analysis;
    modeling points of view for analysis of the architecture of the system based on the functional analysis and the non-functional analysis, to produce an analysis point of view;
    defining at least one rule for analysis of the architecture of the system for each analysis point of view, to produce one or more analysis rules;
    constructing a model of the architecture of the system based on the functional analysis and the non-functional analysis; and
    automatically analyzing and verifying the model of the architecture of the system by evaluation of the analysis rules upon the model for the architecture of the system.

* * * * *